US005866849A

United States Patent [19]

Tuvy et al.

[11] Patent Number: 5,866,849

[45] Date of Patent: *Feb. 2, 1999

[54] CONNECTOR SEALING SLEEVE

[75] Inventors: Avraham Tuvy, Oakhurst, N.J.; David A. Collins, Lawrenceville, Ga.; Pina Schneider, deceased, late of Holmdel, N.J., by Esfira Schneider, executrix

[73] Assignee: Antec Corporation, Norcross, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 689,465

[22] Filed: Aug. 8, 1996

[51] Int. Cl.[6] .................................................. H02G 15/02

[52] U.S. Cl. ...................................... 174/74 A; 174/75 C

[58] Field of Search .............................. 174/74 A, 88 C, 174/75 C

[56] References Cited

U.S. PATENT DOCUMENTS 3,109,052 10/1963 Dumire et al. ........................ 174/88 C
4,352,240 10/1982 Komada ................................ 174/88 C
4,583,811 4/1986 McMills .................................. 439/584
4,674,818 6/1987 McMills et al. ........................ 439/275
5,342,218 8/1994 McMills et al. ........................ 439/578
5,362,250 11/1994 McMills et al. ........................ 439/387
5,401,173 3/1995 Grandchamp et al. ............... 174/88 C
5,418,330 5/1995 Rook ................................ 174/88 C X
5,432,299 7/1995 Ochi ...................................... 174/74 A

*Primary Examiner*—Bot L. Ledynh
*Assistant Examiner*—Marc Machtinger

[57] ABSTRACT

A connector sealing sleeve for use with a coaxial cable box and a coaxial cable connector, the coaxial cable box being of the type having a base and a threaded post and the coaxial cable connector being of the type having an endface and internal threads for threaded engagement with the threaded member of the coaxial cable box, with the connector sealing sleeve being non-cylindrical and including a first sealing surface for engaging and sealing against the threaded post of the coaxial cable box and a second sealing surface for engaging and sealing against the endface of the coaxial cable connector, with the second sealing surface having an annular surface.

14 Claims, 4 Drawing Sheets

CONNECTOR SEALING SLEEVE

TECHNICAL FIELD

The present invention relates to coaxial cable and connectors therefor, and more particularly relates to a sealing sleeve for use with coaxial cable and coaxial cable connectors.

BACKGROUND OF THE INVENTION

In the use of coaxial cable in outdoor environments, such as to connect homes and businesses with cable television service, it is common to provide a splice box or drop box with a threaded post and to connect a coaxial cable thereto using a threaded cable connector which is attached to the end of the coaxial cable. In making this connection, it is advantageous to provide for a weatherproof connection between the coaxial cable and the coaxial cable box. It is known to provide seals in the ends of the coaxial cable connector and the threaded post of the coaxial cable box to help protect the connection. It is also common to provide a deformable sealing sleeve for sealing the threaded post of the coaxial cable box to the connector nut at the end of the coaxial cable.

U.S. Pat. No. 4,074,818 of McMills relates to a method and apparatus for sealing a coaxial cable coupling assembly. This patent teaches the use of a hollow, cylindrically-shaped, elastically deformable sealing sleeve which is disposed over the external threads of the post of the coaxial cable box. The connector nut (of the connector) at the end of the coaxial cable is threaded onto the external threads of the coaxial cable box post and as it is threaded fully thereon, a portion of the cylindrically-shaped, elastically deformable sealing sleeve is forced outwardly over an external surface of the connector nut. In this way, the sealing sleeve of McMills, et al. is stretched and held in tension by the male threads of the coaxial cable box post and also by the external surface of the connector nut at the end of the coaxial cable. One disadvantage of this arrangement is that an air space is created adjacent the end of the connector nut. This air space allows moisture vapor transmission through the elastomeric sleeve in direct proportion to the volume of air in the space. Thus, it would be advantageous to minimize or completely avoid such an air space. Another disadvantage of the McMills '818 apparatus is that it can be difficult to thread the connector nut onto the threads of the post inasmuch as the sealing sleeve must be long enough to ride over at least a portion of the connector nut, requiring that the sealing sleeve cover all or almost all of the post's threads prior to installation of the connector nut.

Accordingly, it can be seen that a need yet remains for a connector sealing sleeve which effectively seals the connector nut at the end of the coaxial cable to the threaded post of the coaxial cable box, while minimizing or avoiding the creation of an air space to minimize vapor transmission through the seal, and which allows the connector nut to be easily and quickly threaded onto the male threads of the coaxial cable box post. It is to the provision of such a connector sealing sleeve that the present invention is primarily directed.

SUMMARY OF THE INVENTION

Briefly described, in a preferred form, the present invention comprises a connector sealing sleeve for use with a coaxial cable box and coaxial cable connector. The coaxial cable box is of the type having a base and a threaded post and the coaxial cable connector is of the type having an endface and internal threads for threaded engagement with the threaded post of the coaxial cable box. The connector sealing sleeve comprises a non-cylindrical sealant body including a first sealing surface for engaging and sealing against the threaded post of the coaxial cable box. The non-cylindrical sealant body also includes a second sealing surface for engaging and sealing against the endface of the coaxial cable connector.

Preferably, the second sealing surface of the connector sealing sleeve comprises an annular surface adjacent a first end of the connector sleeve. Also preferably, the connector sealing sleeve further comprises a flange adjacent the first end of the connector sealing sleeve for supporting and bolstering the annular surface. Further, with the coaxial cable connector fully threaded onto the threaded post of the coaxial cable box, preferably the endface of the coaxial cable connector is spaced a predetermined distance from the base of the coaxial cable box and the connector sealing sleeve has an uncompressed free length which is greater than the predetermined distance. Preferably, the connector sealing sleeve has a non-uniform wall thickness which is thickest adjacent the annular sealing surface.

A sealing sleeve according to the present invention has numerous advantages. For example, by sealing against the endface of the connector nut, rather than stretching the sleeve over the circumferential surface of the connector nut, the creation of an undesirable air space is avoided. This minimizes vapor transmission through the sealing sleeve, thereby improving the overall quality of the seal. Also, since the seal is maintained against the endface of the connector nut, the sealing sleeve can be short enough such that when installed on the threads of the coaxial cable box post prior to the installation of the connector nut of the coaxial cable, the sealing sleeve leaves some of the post's threads exposed, thereby making it easier to thread the connector nut onto the threads of the post.

Accordingly, it is an object of the present invention to provide a sealing sleeve for sealing a connector nut of a coaxial cable to a coaxial cable box, which sealing sleeve is effective, simple, and durable.

It is another object of the present invention to provide a sealing sleeve which seals against the endface of a connector nut of a coaxial cable.

It is another object of the present invention to provide a sealing sleeve for sealing a connector nut of a coaxial cable to a coaxial cable box and which minimizes or avoids the creation of an undesirable air space thereat.

It is another object of the present invention to provide a sealing sleeve for sealing a connector nut of a coaxial cable to coaxial cable box, which serves to allow the cable nut to be threaded on the threaded post of the coaxial cable box easily and quickly.

These and other objects, features, and advantages of the present invention will become apparent upon reading the following specification in conjunction with the accompany drawing figures.

BRIEF DESCRIPTION OF THE DRAWING FIGURES

DETAILED DESCRIPTION OF THE PREFERRED EMBODIMENT

Figure 1:
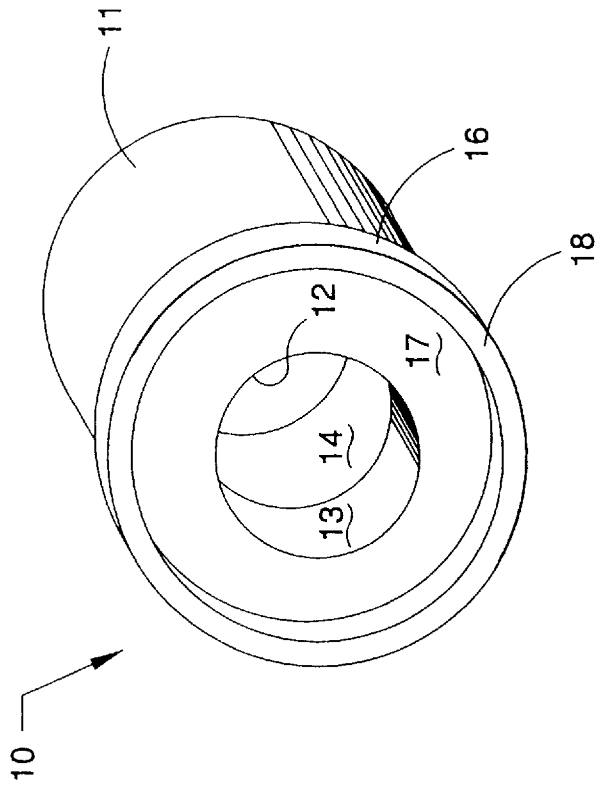
FIG. 1 is a perspective illustration of a connector sealing sleeve according to a preferred for the invention.

Referring now in detail to the drawing figures, wherein like reference numerals depict like parts throughout the several views, FIG. 1 shows a connector sealing sleeve 10 according to a preferred form of the invention. In the following description of the connector sealing sleeve, an illustrative embodiment is described. While the illustrative embodiment is described with specificity, including various dimensions, it is to be understood that the invention is not to be limited to the exact details described herein. Persons skilled in the art will recognize that numerous changes and variations are possible.

Figure 2:
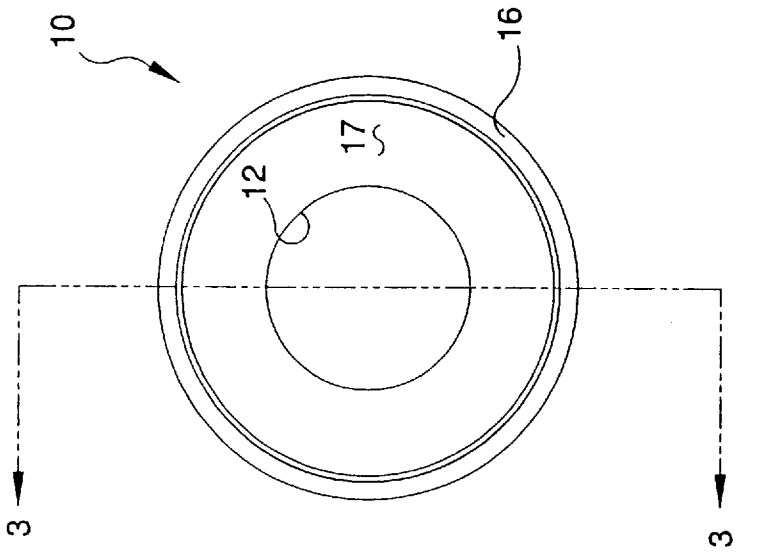
FIG. 2 is a front view of the connector sealing sleeve of FIG. 1.

The connector sealing sleeve 10 includes a main body portion 11 with a central passageway 12 extending therethrough. The central passageway 12 includes a cylindrical portion 13 and a tapered portion 14. Referring now to both FIG. 1 and FIG. 2, it can be seen that the connector sealing sleeve 10 also includes a flange 16. Adjacent the flange 16 is an annular sealing surface 17. A lip portion or rim 18 of the flange 16 extends longitudinally of the remainder of the flange 16.

Figure 3:
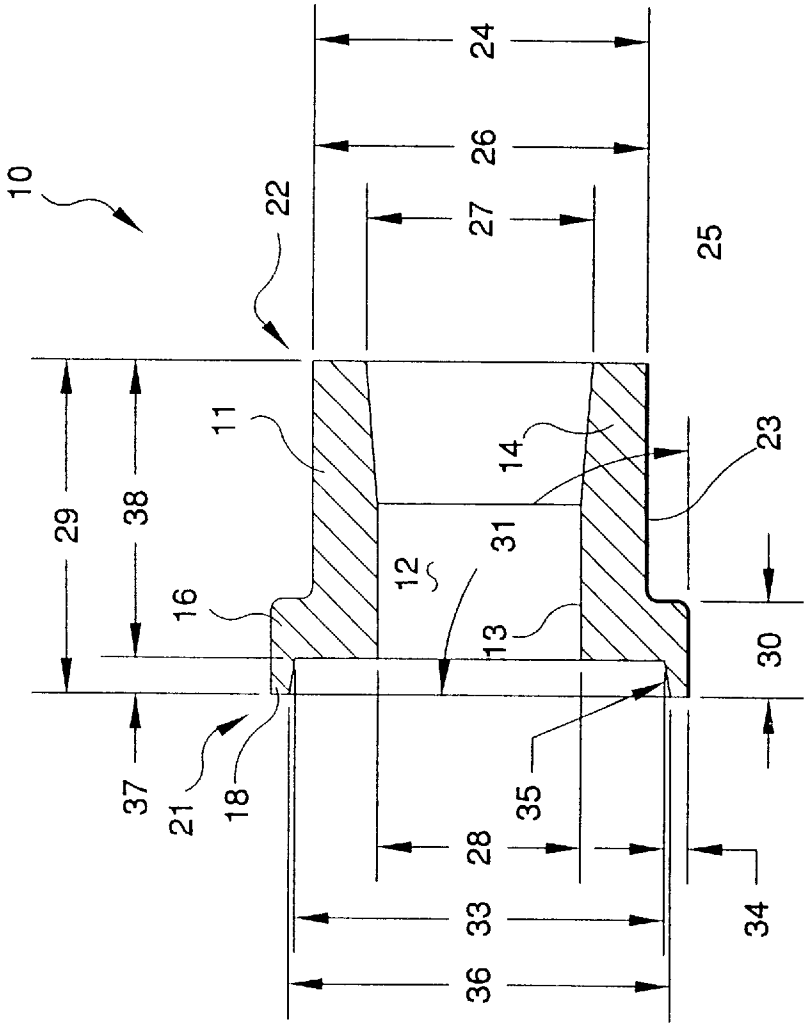
FIG. 3 is a sectional view of the connector sealing sleeve of FIG. 1, taken along lines 3—3 of FIG. 2.

FIG. 3 shows the connector sealing sleeve 10 in cross-section and in more detail. The connector sealing sleeve 10 has a first end 21 and a second end 22 opposite thereto. The main body portion 11 can be seen to be non-cylindrical and has an outside surface 23 which is frusto-conical, tapering to a smaller diameter 24 of 0.448 inches. The angle 26 of the taper of the outside surface 23 is 4°. An endface 25 is adjacent second end 22 and is perpendicular to the longitudinal axis of the connector sealing sleeve 10 for engaging and sealing against the base of the coaxial cable box. The connector sealing sleeve 10 has an overall length 29 of 0.440 inches.

As can be seen in FIG. 3, the cylindrical portion 13 of the central passageway 12 is approximately one-half the overall length of the central passageway. Likewise, the tapered portion 14 of the central passageway 12 comprises the other half of the longitudinal length of the central passageway 12. The tapered portion 14 is tapered in the opposite direction relative to the tapered outside surface 23 of the main body portion 11. This results in the wall thickness of the main body position 11 being thinnest near the second end 22 and thickest near the first end 21. The tapered portion 14 of the central passageway 12 has a taper angle 27 which is 8.4°. The tapered opening and tapered wall thickness allow the sleeve to be slipped over the threaded post of a coaxial cable box more easily. The cylindrical portion 13 of the central passageway 12 has a diameter 28 of 0.270 inches.

The flange 16 is generally "L"-shaped with a length 30 of 0.120 inches and is positioned adjacent the first end 21 of the connector sealing sleeve 10. As can be seen in FIG. 3, the flange is formed at the thickest portion of the main body portion 11 and adds to the wall thickness thereat, resulting in a wall thickness at the flange which is substantially greater than the wall thickness at the second end 22 of connector sealing sleeve 10. The flange 16 itself is frusto-conical such that the angle from the outside of the flange to a line perpendicular to the longitudinal axis of the connector sealing sleeve defines an angle of 88°. This is depicted in the figure by reference numeral 31. The flange 16 includes the rim portion 18 which has a minimum inside diameter 33 of 0.500 inches. The rim 18 has a thickness 34 of 0.050 inches and an inside surface 35 which is tapered at an angle 36 of 6°. The height 37 of the rim 18 is 0.050 inches, thereby recessing the annular sealing surface 17 by a like amount from the end 21.

Figure 4:
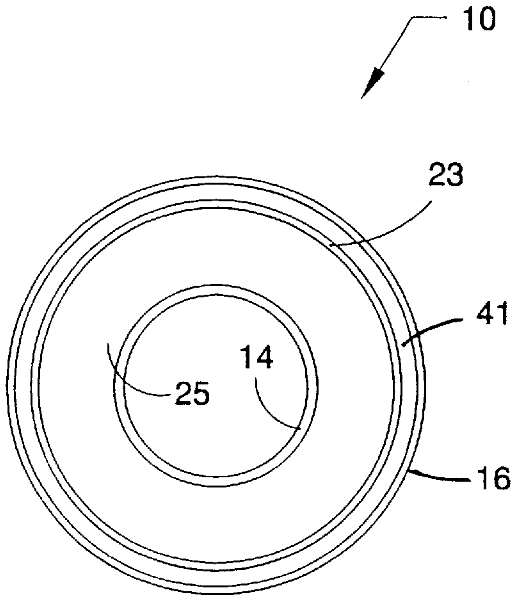
FIG. 4 is a rear view of the connector sealing sleeve of FIG. 1.

FIG. 4 shows a rear view of the connector sealing sleeve 10. From this view, endface 25 can be clearly seen, as well as the tapered surface 14 of the central passageway. The tapered outside surface 23 of the main body portion can be seen, as well as a backside surface 41 of the "L-"shaped flange 16.

Figure 5:
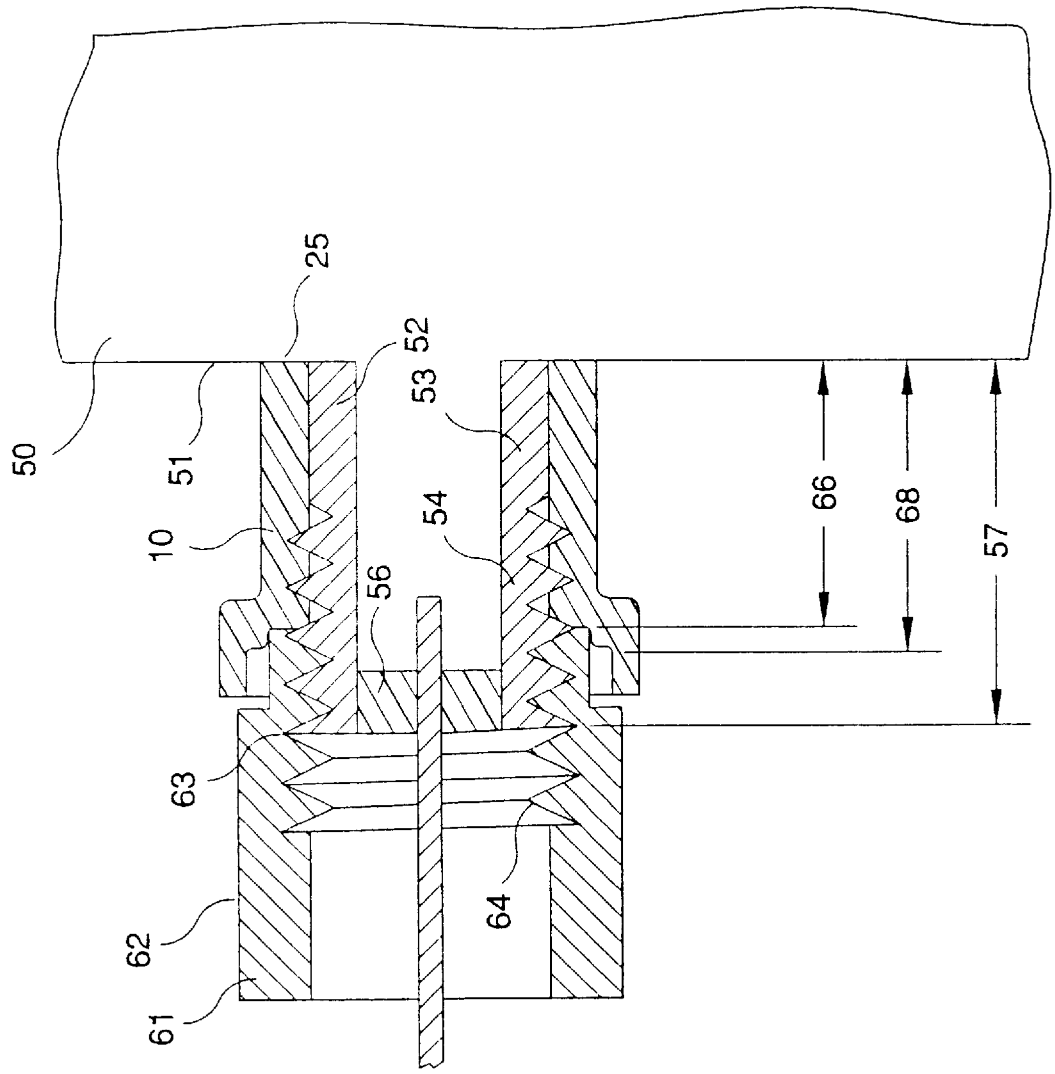
FIG. 5 is schematic, sectional view of the connector sealing sleeve of FIG. 1, shown mounted on a threaded post of a coaxial cable box and shown sealing against a connector nut attached to a coaxial cable.

FIG. 5 shows the connector sealing sleeve 10 in use in connection with a coaxial cable box 50 . The coaxial cable box 50 has a base or base surface 51 and a threaded post 52 for receiving a coaxial cable connector. The dimensions of the threaded portion of the threaded post 52 are exaggerated for clarity. In actuality, typical threads on such a post are not as large as are depicted in the drawing figure. The threaded post includes a non-threaded shank portion 53 and a threaded end 54. Moreover, the threaded post typically includes a weather seal 56 on the end of the post for receiving a solid wire of the coaxial cable therethrough, providing a weather seal thereat. One such threaded post is commonly referred to as an "F-port". Such an F-port has a predetermined distance or height 57 measured from the base 51 of the coaxial cable box 50.

The coaxial cable is connected to the threaded post 52 using a cable connector with a cable connector nut 61. The cable connector nut 61 has nut surfaces 62 and a collar portion 63 at the distal end of the connector nut. The connector nut includes internal threads 64 for threaded engagement with the threads 54 of the threaded post 52. With the connector nut 61 fully tightened onto the threads of the threaded post 52, an endface of the collar 63 is spaced a predetermined distance 66 from the base 51 of the coaxial cable box 50.

The connector sealing sleeve 10 has an uncompressed, free length 38 which is greater than the predetermined distance 66. Referring now to FIG. 3, this uncompressed free length 38 is defined herein to be the distance from the endface 25 to the annular endface 17. Considering again FIG. 5, one can see that the endface of the collar 63, when the connector nut 61 is fully threaded onto the threaded post 52, compresses the connector sleeve 10 and forms a good seal at the interface or contact point between the endface of the collar 63 and the annular sealing surface 17 of the connector sleeve. With the connector nut threaded on the post, the extra thickness adjacent the annular sealing surface 17 helps to keep the sleeve from stretching and riding up over the outside surface of the connector nut. Also, the inside surfaces 13 and 14 of the connector sealing sleeve 10 grippingly engage the shank portion 53 and the threaded portion 54 of the threaded post and seal against the threaded post. Additionally, the endface 25 of the connector sealing sleeve 10 is forced against the base 51 of the coaxial cable box 50 and forms a compression seal thereat as well.

As shown in FIG. 5, when the connector nut is tightened on the threaded post, part of the annular sealing surface 17 is deformed by compression by the endface of the collar 62 such that the entire annular sealing surface 17 is no longer planar, but rather that only some of it remains planar and remains in contact with the endface of the collar 62, while other portions are deformed by the compressive forces exerted by the endface of the collar 62.

Preferably, the connector sealing sleeve 10 is made by injection molding and is made of polypropylene/EPDM rubber alloy material. Alternatively, other materials could be employed, such as silicone rubber. Other appropriate materials choices will be apparent to the skilled designer.

While the invention has been described a preferred form, it will be apparent to those skilled in the art that many modifications, additions, and deletions may be made therein without departing from the spirit and the scope of the invention as set forth in the following claims.

What is claimed is:

1. A connector sealing sleeve for connection between a coaxial cable box and a coaxial cable connector, the coaxial cable box having a base and a threaded post extending from the base for receiving the coaxial cable connector, said post having external threads on its outer surface, the coaxial cable connector having a connector nut having an endface and internal threads for threaded engagement with the threaded post, said connector sealing sleeve comprising:

a compressible body having a central passageway extending longitudinally therethrough, said passageway being of a dimension to allow the body to be placed over the threaded post of the coaxial cable box;

wherein said body has a first end having a first sealing surface and a second end having a second sealing surface, such that when said connector nut is threaded onto the threaded post, the endface of the connector nut contacts said first sealing surface and the base of the coaxial cable box contacts said second sealing surface.

2. A connector sealing sleeve as claimed in claim 1 wherein when the connector nut is fully threaded onto the threaded post of the coaxial cable box, the endface of the connector nut is spaced a predetermined distance from the base of the coaxial cable box and wherein said body has an uncompressed free length greater than the predetermined distance.

3. A connector sealing sleeve as claimed in claim 1 wherein said body has a tapered exterior surface.

4. A connector sealing sleeve as claimed in claim 1 wherein said body has a nonuniform wall thickness which is thicker at said first end and thinner at said second end.

5. A connector sealing sleeve as claimed in claim 1 wherein said passageway is defined by an internal wall surface, and wherein said internal wall surface engages and seals against the threaded post of the coaxial cable box.

6. The connector sealing sleeve recited in claim 1 wherein said first and second sealing surfaces are annular and are generally perpendicular to the longitudinal axis of said passageway.

7. The connector sealing sleeve recited in claim 1 wherein said body further comprises a flange extending outwardly from said first end of said body, said flange having a lip away from said body for at least partly shrouding said first sealing surface.

8. The connector sealing sleeve recited in claim 1 wherein said passageway has a generally circular cross-section.

9. The connector sealing sleeve recited in claim 1 wherein a portion of said passageway near said first end is cylindrical and has a first diameter, and a portion of said passageway near said second end is tapered from said first diameter to a larger second diameter.

10. The connector sealing sleeve recited in claim 1 wherein said first sealing surface has a larger area than said second sealing surface.

11. The connector sealing sleeve recited in claim 1 wherein said body is made of a compressible rubber alloy material.

12. The connector sealing sleeve recited in claim 11 wherein said body is slightly deformed when said connector nut is fully threaded onto the threaded post of the coaxial cable box.

13. The connector sealing sleeve recited in claim 1 wherein said body is not threaded.

14. The connector sealing sleeve recited in claim 1 wherein when said connector nut is threaded onto the threaded post, the endface of the connector nut contacts less than all of said first sealing surface and the base of the coaxial cable box contacts all of said second sealing surface.

* * * * *